US012643248B2

(12) United States Patent
Carlson et al.

(10) Patent No.: US 12,643,248 B2
(45) **Date of Patent: *Jun. 2, 2026**

(54) TWO WHEELED ROBOT WITH ENHANCED CLIMBING FEATURES

(71) Applicant: ReconRobotics, Inc., Edina, MN (US)

(72) Inventors: Casey R. Carlson, Independence, MN (US); Andrew Drenner, Savage, MN (US); Alex J. Kossett, Minnetonka, MN (US); Ian T. Burt, West St. Paul, MN (US)

(73) Assignee: ReconRobotics, Inc., Edina, MN (US)

( * ) Notice: Subject to any disclaimer, the term of this patent is extended or adjusted under 35 U.S.C. 154(b) by 81 days.

This patent is subject to a terminal disclaimer.

(21) Appl. No.: 18/216,534

(22) Filed: Jun. 29, 2023

(65) Prior Publication Data

US 2024/0109208 A1 Apr. 4, 2024

Related U.S. Application Data

(63) Continuation of application No. 17/729,239, filed on Apr. 26, 2022, now Pat. No. 11,691,302, which is a
(Continued)

(51) Int. Cl.
B25J 19/02 (2006.01)
B25J 5/00 (2006.01)
(Continued)

(52) U.S. Cl.
CPC ............. B25J 19/023 (2013.01); B25J 5/007 (2013.01); B60B 9/10 (2013.01); B62D 57/02 (2013.01); B62D 61/00 (2013.01); Y10S 901/01 (2013.01)

(58) Field of Classification Search
CPC .. B25J 5/007; B25J 19/23; B60B 9/10; B62D 57/02; B62D 61/00; Y10S 901/01
(Continued)

(56) References Cited

U.S. PATENT DOCUMENTS 2,818,301 A 12/1957 Hayden
4,061,199 A 12/1977 Last
(Continued)

FOREIGN PATENT DOCUMENTS

EP 1870254 12/2007
FR 2567078 A1 1/1986
(Continued)

OTHER PUBLICATIONS

Hearing Notice for Application No. 5272/DELNP/2011, dated Dec. 10, 2019 (3 pages.).
(Continued)

*Primary Examiner* — Adam D Tissot
(74) *Attorney, Agent, or Firm* — Christensen, Fonder, Dardi & Busse PLLC; Douglas J. Christensen

(57) ABSTRACT

A robot has an electronic surveillance system embedded within a chassis disposed between two wheels. The wheels include a main body and a plurality of treads. The treads are generally disposed radially around the main body and extend distally from outer portion of the main body. The main body generally defines a plurality of compression cells and may present a substantially frustoconical outer surface.

15 Claims, 13 Drawing Sheets

Related U.S. Application Data continuation of application No. 16/909,406, filed on Jun. 23, 2020, now Pat. No. 11,312,031, which is a continuation of application No. 15/717,443, filed on Sep. 27, 2017, now Pat. No. 10,688,671, which is a continuation of application No. 14/747,780, filed on Jun. 23, 2015, now abandoned, which is a continuation of application No. 14/012,910, filed on Aug. 28, 2013, now Pat. No. 9,061,544, which is a continuation of application No. 12/634,610, filed on Dec. 9, 2009, now abandoned.

(60) Provisional application No. 61/121,141, filed on Dec. 9, 2008.

(51) Int. Cl.
  *B60B 9/10* (2006.01)
  *B62D 57/02* (2006.01)
  *B62D 61/00* (2006.01)

(58) Field of Classification Search
  USPC ........................................................ 180/218
  See application file for complete search history.

(56) References Cited

U.S. PATENT DOCUMENTS

| | | | |
|---|---|---|---|
| D338,474 S | 8/1993 | Christensen | |
| 5,487,692 A | 1/1996 | Mowrer et al. | |
| 6,502,657 B2 | 1/2003 | Kerrebrock et al. | |
| 6,548,982 B1 * | 4/2003 | Papanikolopoulos | B62D 57/02 |
| | | | 318/568.11 |
| 6,615,885 B1 * | 9/2003 | Ohm | B60B 9/26 |
| | | | 152/11 |
| 6,824,508 B2 | 11/2004 | Kim et al. | |
| 6,860,346 B2 | 3/2005 | Burt et al. | |
| D540,503 S | 4/2007 | Tsang | |
| 7,249,640 B2 * | 7/2007 | Horchler | B62D 57/022 |
| | | | 180/7.1 |
| D584,366 S | 1/2009 | Bowen et al. | |
| 7,559,385 B1 * | 7/2009 | Burt | B60K 7/0007 |
| | | | 180/167 |
| 8,100,205 B2 * | 1/2012 | Gettings | B62D 55/06 |
| | | | 180/9.1 |
| 8,197,298 B2 * | 6/2012 | Willett | A63H 33/005 |
| | | | 446/164 |
| 8,496,077 B2 * | 7/2013 | Nesnas | B62D 63/02 |
| | | | 180/7.5 |
| 9,061,544 B2 | 6/2015 | Carlson et al. | |
| 10,688,671 B2 | 6/2020 | Carlson et al. | |
| 11,312,031 B2 | 4/2022 | Carlson et al. | |
| 11,691,302 B2 | 7/2023 | Carlson et al. | |
| 2003/0038607 A1 | 2/2003 | Yim et al. | |
| 2003/0092964 A1 | 5/2003 | Kim et al. | |
| 2004/0000439 A1 * | 1/2004 | Burt | B60B 15/00 |
| | | | 180/7.1 |
| 2006/0202439 A1 | 9/2006 | Kahlert et al. | |
| 2007/0080000 A1 | 4/2007 | Tobey et al. | |
| 2008/0143065 A1 | 6/2008 | DeFazio et al. | |
| 2008/0173493 A1 | 7/2008 | Adachi | |
| 2009/0099709 A1 | 4/2009 | Troy | |
| 2011/0240382 A1 | 10/2011 | Gettings et al. | |
| 2014/0224560 A1 | 8/2014 | Carlson et al. | |
| 2016/0144517 A1 | 5/2016 | Carlson et al. | |
| 2018/0290312 A1 | 10/2018 | Carlson et al. | |
| 2021/0078188 A1 | 3/2021 | Carlson et al. | |
| 2022/0362951 A1 | 11/2022 | Carlson et al. | |

FOREIGN PATENT DOCUMENTS

| | | |
|---|---|---|
| WO | WO0224417 | 3/2002 |
| WO | WO2010068704 | 6/2010 |

OTHER PUBLICATIONS

File history for U.S. Appl. No. 29/351,692, filed Dec. 9, 2009. Inventors: Casey R. Carlson et al.

Dunbar, Thomas W., "Demonstration of Waypoint Navigation for a Semi-Autonomous Prototype Surf-Zone Robot," (Master of Science Thesis, Naval Postgraduate School, Jun. 2006), 63 pages.

File history for U.S. Appl. No. 12/634,610, filed Dec. 9, 2009, Inventors: Casey R. Carlson et al.

Admitted Prior Art reference, Dec. 1, 2008.

Dunbar, Thomas W., "Demonstration of Waypoint Navigation for a Semi-Autonomous Prototype Surf-Zone Robot," (Master of Science Thesis, Naval Postgraduate School, Jun. 2006), 63 pgs.

* cited by examiner

TWO WHEELED ROBOT WITH ENHANCED CLIMBING FEATURES

CROSS-REFERENCE TO RELATED APPLICATIONS

The present application is a continuation of U.S. patent application Ser. No. 17/729,239, filed Apr. 26, 2022, which is a continuation of U.S. patent application Ser. No. 16/909,406, filed Jun. 23, 2020, now U.S. Pat. No. 11,312,031, which is a continuation of U.S. patent application Ser. No. 15/717,443, filed Sep. 27, 2017, now U.S. Pat. No. 10,688,671, which is a continuation of U.S. patent application Ser. No. 14/747,780, filed Jun. 23, 2015, now abandoned, which is a continuation of U.S. patent application Ser. No. 14/012,910, filed Aug. 28, 2013, now U.S. Pat. No. 9,061,544, which is a continuation of U.S. patent application Ser. No. 12/634,610, filed Dec. 9, 2009, now abandoned, which claims the benefit of U.S. Provisional Application No. 61/121,141 filed Dec. 9, 2008, all of which are incorporated herein in their entireties by reference.

TECHNICAL FIELD

The present invention relates to robotic vehicles. More particularly, the present invention relates to remotely controlled robots having wheeled mobility with improved climbing capabilities for use in surveillance activities.

BACKGROUND OF THE INVENTION

Electronic reconnaissance, surveillance, and security monitoring activities (hereinafter referred to collectively as "electronic surveillance") have become an integral investigation tool for both military and civilian organizations alike. While by no means a complete list, tasks such as hostage rescue, terrorist response, drug raids, building searches, facility monitoring, and site contamination investigation may all benefit from information provided by surveillance systems.

Such electronic surveillance may be by mounted video cameras or may be provided by portable mobile robots. These robots may travel into areas deemed unsafe or otherwise unfriendly to humans and relay information back to remote personnel typically by wireless means, such as is disclosed in U.S. Pat. No. 6,548,982 (the "982 patent"), which is incorporated by reference herein.

A number of existing surveillance robots incorporate wheels as their primary mode of maneuverability and ground traction. A major drawback of such wheels, however, is a limited climbing ability. In particular, the size of a robot's wheels generally dictates how large of an object the robot can climb. Cost and functionality-related constraints, however, generally do not permit the use of wheels having a radius above a certain size. For example, wheels that are too large would increase weight, visibility, and throwing difficulty, all of which would detract from the overall effectiveness of the robot. As a result, wheel size cannot be indefinitely increased as a means to improve the climbing ability of surveillance robots.

Many existing surveillance robots use wheels that prevent the robot from climbing over objects as small as 0.5-inch in height. It would be desirable to have a two-wheeled robot capable of climbing over obstacles that are 1.5 to 2 inches or more in height without substantially increasing the radius of the wheel.

As previously indicated, surveillance robots are often utilized in hostile environments. As a result, the robots are thrown by the user across a certain distance from a safe location to another, possibly dangerous location. The impact resulting from the robot striking an object such a wall or the ground can potentially harm the electronic component. Therefore, there is a need for improvements in absorbing impact-related forces in a manner that reduces the potential for damage to the robot.

There is a further need to improve weight balance and stabilization, provide an attachment point for hauling additional objects with the surveillance robot, and reduce the noise and friction associated with the robot.

SUMMARY AND DESCRIPTION OF THE INVENTION

A surveillance robot according to an embodiment of the present invention substantially meets the aforementioned needs of the industry. The surveillance robot comprises two wheels coupled to opposite ends of a body. The wheels provide improved mobility by enhancing the climbing capabilities of the surveillance robot. In an embodiment, each wheel includes a main portion with paddles extending outwardly from the main portion. The paddles include a stabilizer oriented radially outwardly the main portion of the tire and a contact pad that is oriented at a forward angle with respect to the stabilizer.

A feature and advantage of certain embodiments of the invention is that the paddles deflect radially inward when on a surface and when driving on the surface, and when climbing, the hook shape may extent radially outward to a straighter position that provides an extending gripping action of an object that the robot is climbing over.

A feature and advantage of certain embodiments of the invention is that the radially inward deflection of the paddles when the vehicle is driving forward smooths out the ride of the housing and consequently smooths out the video being transmitted.

A feature and advantage of certain embodiments of the invention is that the paddles provide enhanced climbing ability beyond what normal tires and treads would provide. Moreover, the arcuate shaped paddles provide better-smoother performance on video capture and transmission.

Figures 1, 2, 3A, 3B, 3C:
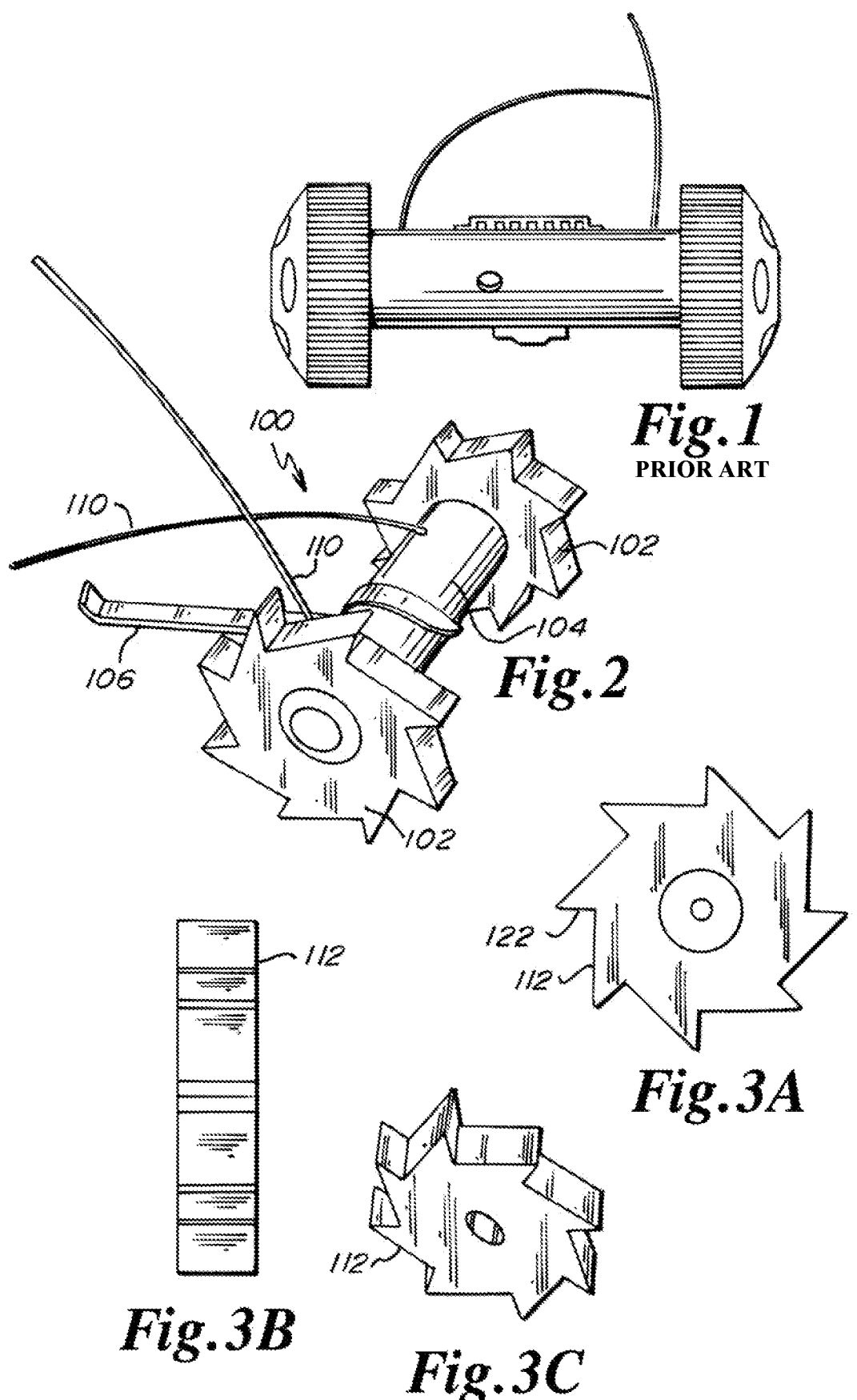
FIG. 1 is a perspective view of a prior art surveillance robot with video capabilities.
FIG. 2 is a perspective view of a surveillance robot according to an embodiment of the present invention.
FIG. 3A is a side view of a wheel of a surveillance robot according to an embodiment of the present invention.
FIG. 3B is a front view of a wheel of a surveillance robot according to an embodiment of the present invention.
FIG. 3C is a perspective view of a wheel of a surveillance robot according to an embodiment of the present invention.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION

A robot according to the prior art is depicted generally in FIG. 1. A surveillance robot according to an embodiment is depicted generally in FIG. 2 with reference numeral 100. Like the prior art robot of FIG. 1, surveillance robot 100 generally includes wheels 102, body 104, tail 106, camera 108, and antennae 109. Body 104 is disposed intermediate wheels 102 and houses most of the electronic and mechanical components of surveillance robot. Camera 108 is generally disposed within body 104 and oriented forward, or away from tail 106. Tail 106 generally extends rearwardly to prevent rotation of body 104 when wheels 102 are rotatably driven with respect to body 104. Antennae 109 generally extend from body 104 and are connected to transceiver circuitry for controlling motion and sending images to a remote controller.

In an embodiment, wheel 102 includes tire 110 and tire mount 112. Tire mount 112 is generally coupled to opposite ends of body 104. Each tire 112 is generally coupled to tire mount 112 and thereby attached to body 104. Wheels 102 may be secured to body 104 in any number of ways, such as, for example, with a nut or other similar fastening member.

Referring to FIGS. 3A-3C, 4A-4C, and 5A-5C, various embodiments of tires 112 are depicted. Tires 112 have main portion, or hub, 116 and paddles 118. Each paddle 118 generally includes stabilizer section 120, transition portion 121, and contact pad 122. Contact pad 122 has tip 124.

Figures 4A, 4B, 4C, 5A, 5B, 5C:
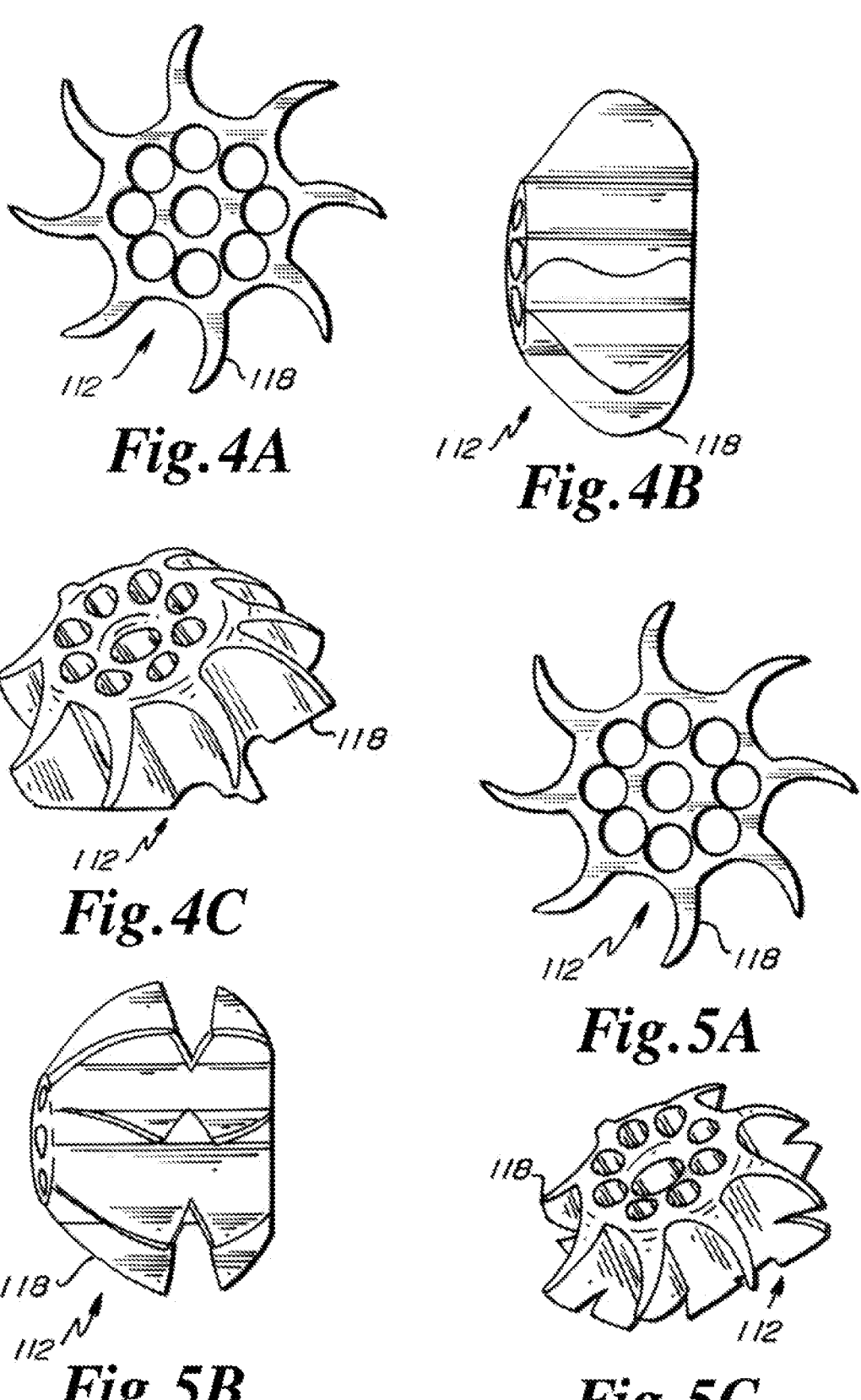
FIG. 4A is a side view of a wheel of a surveillance robot according to an embodiment of the present invention.
FIG. 4B is a front view of a wheel of a surveillance robot according to an embodiment of the present invention.
FIG. 4C is a perspective view of a wheel of a surveillance robot according to an embodiment of the present invention.
FIG. 5A is a side view of a wheel of a surveillance robot according to an embodiment of the present invention.
FIG. 5B is a front view of a wheel of a surveillance robot according to an embodiment of the present invention.
FIG. 5C is a perspective view of a wheel of a surveillance robot according to an embodiment of the present invention.
Figures 6, 7:
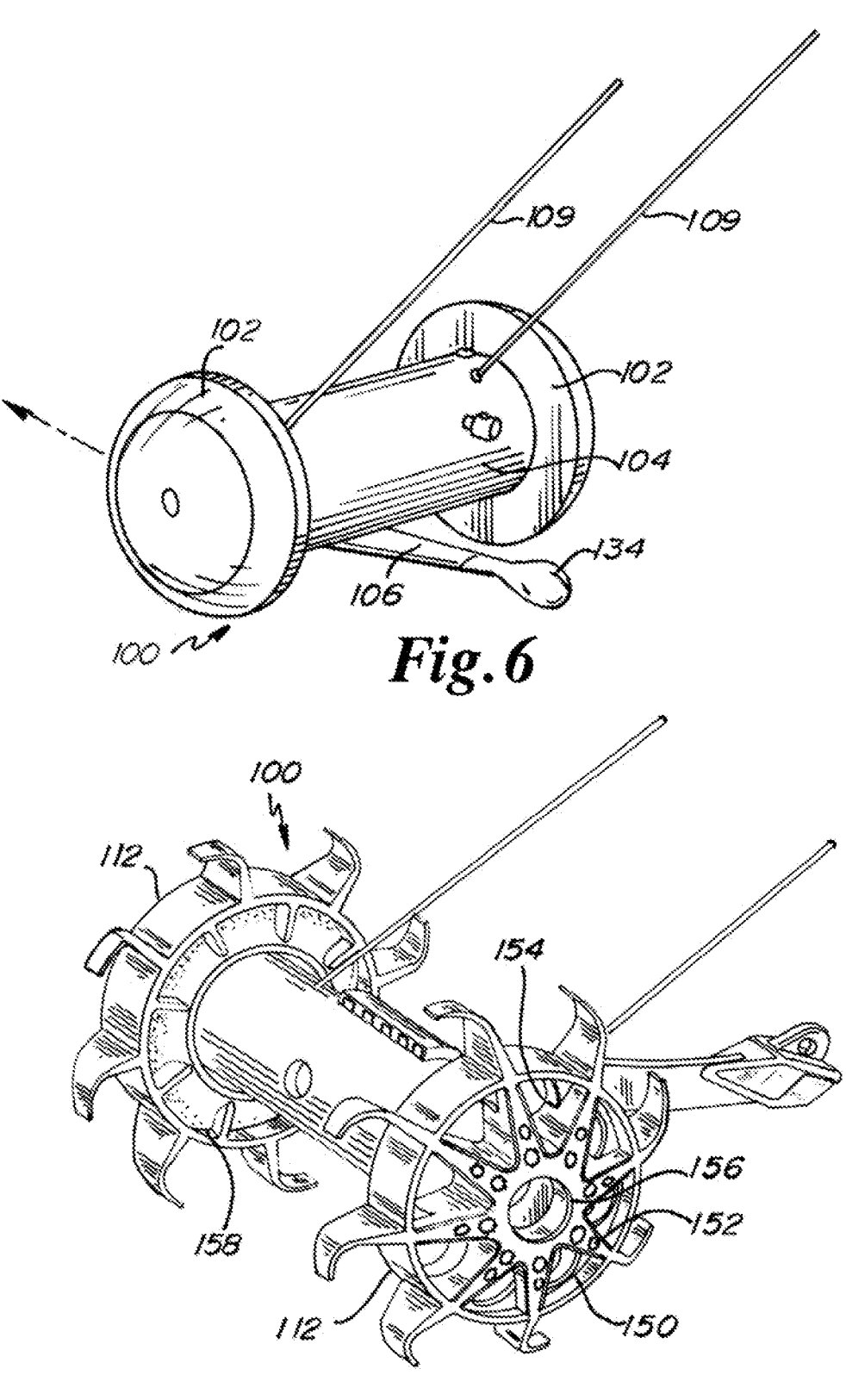
FIG. 6 is a perspective view of a surveillance robot according to an embodiment of the present invention.
FIG. 7 is a front perspective view of a surveillance robot according to an embodiment of the present invention, with a portion of the tail depicted in phantom.
Figures 8, 9:
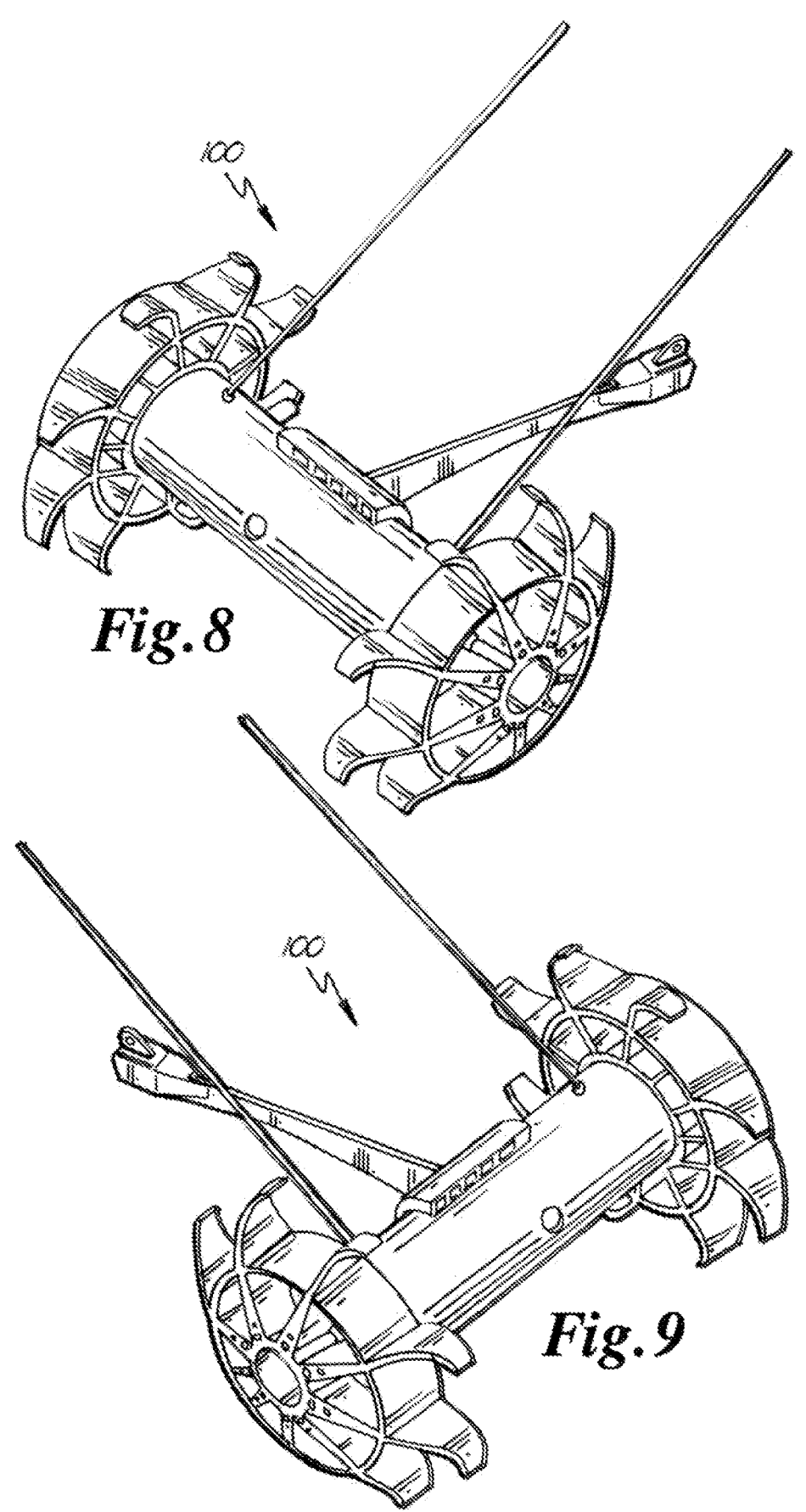
FIG. 8 is a front perspective view of a surveillance robot according to an embodiment of the present invention, with a portion of the tail depicted in phantom.
FIG. 9 is a front perspective view of a surveillance robot according to an embodiment of the present invention, with a portion of the tail depicted in phantom.
Figures 10, 11:
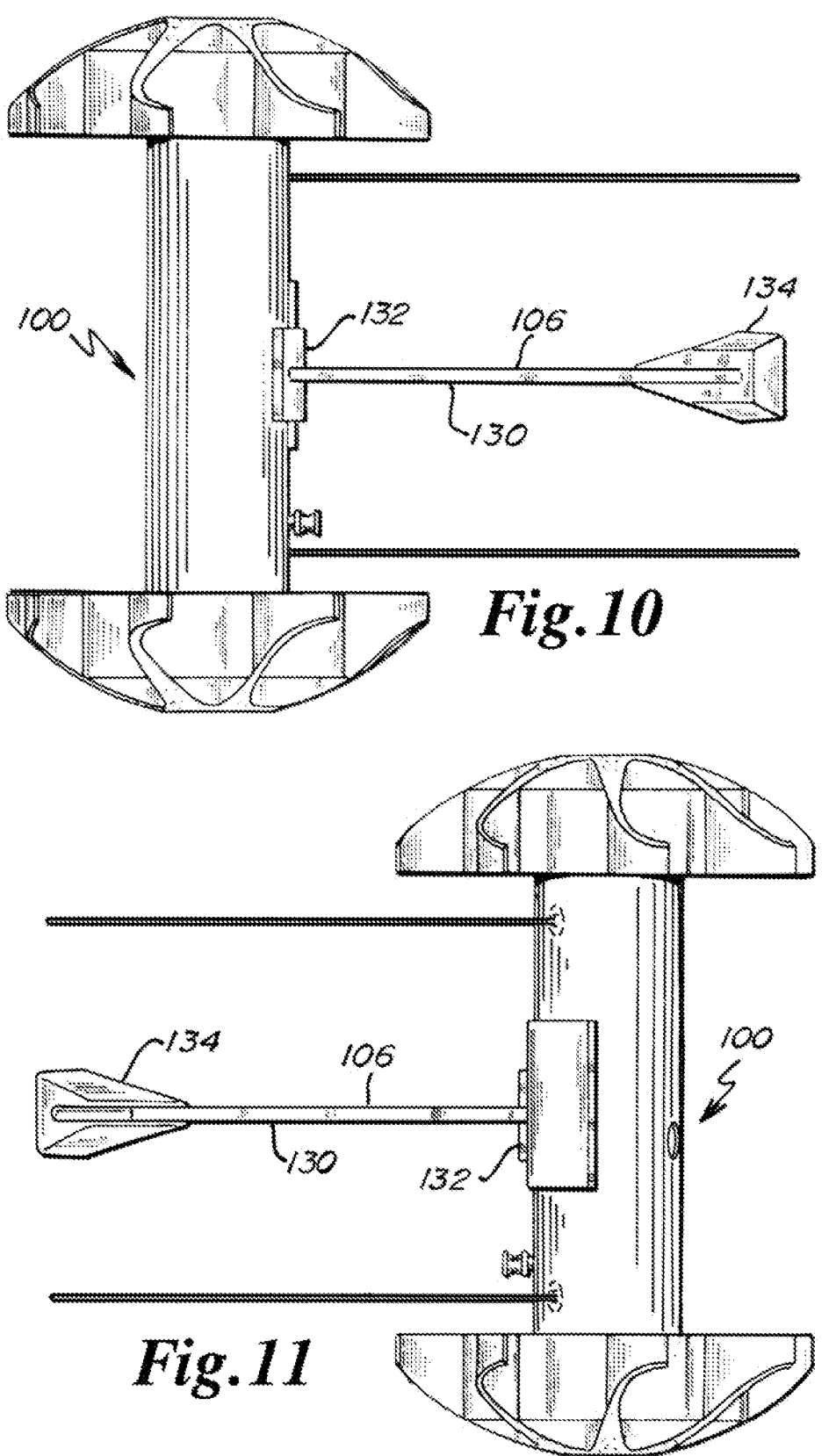
FIG. 10 is bottom plan view of a surveillance robot according to an embodiment of the present invention, with a camera mount and a portion of the tail depicted in phantom.
FIG. 11 is a top plan view of a surveillance robot according to an embodiment of the present invention, with a camera mount and a portion of the tail depicted in phantom.
Figure 12:
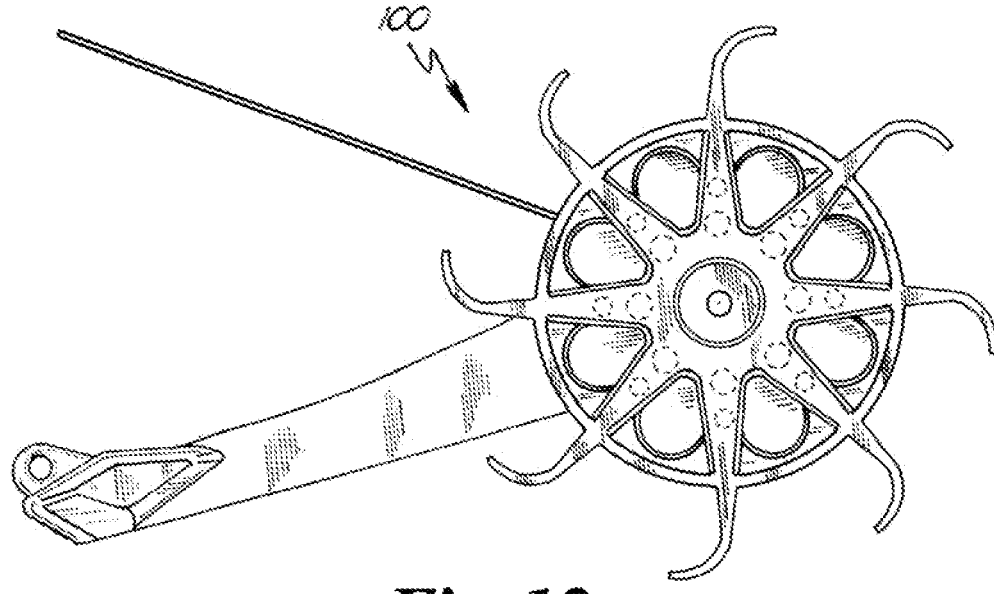
FIG. 12 is a side view of a surveillance robot according to an embodiment of the present invention, with a portion of the tail depicted in phantom.
Figure 13:
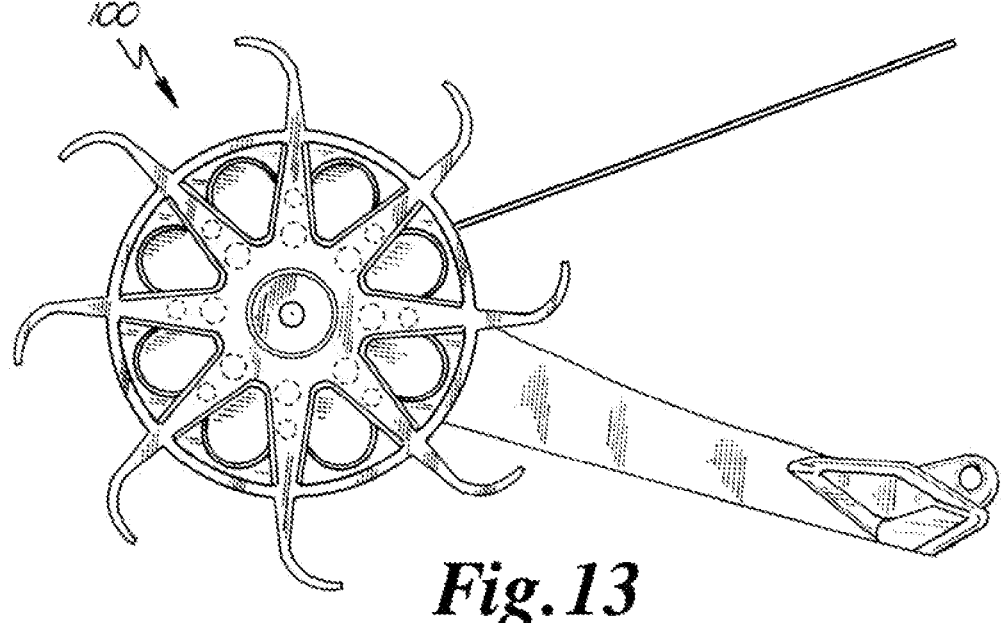
FIG. 13 is a side view of a surveillance robot according to an embodiment of the present invention, with a portion of the tail depicted in phantom.
Figure 14:
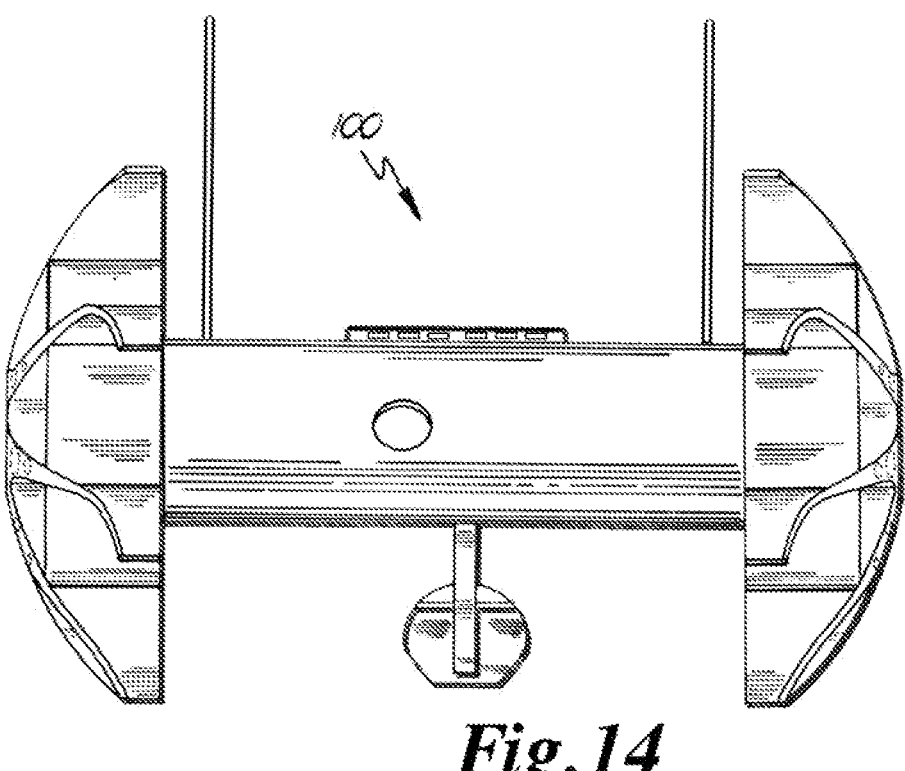
FIG. 14 is a front view of a surveillance robot according to an embodiment of the present invention.
Figure 15:
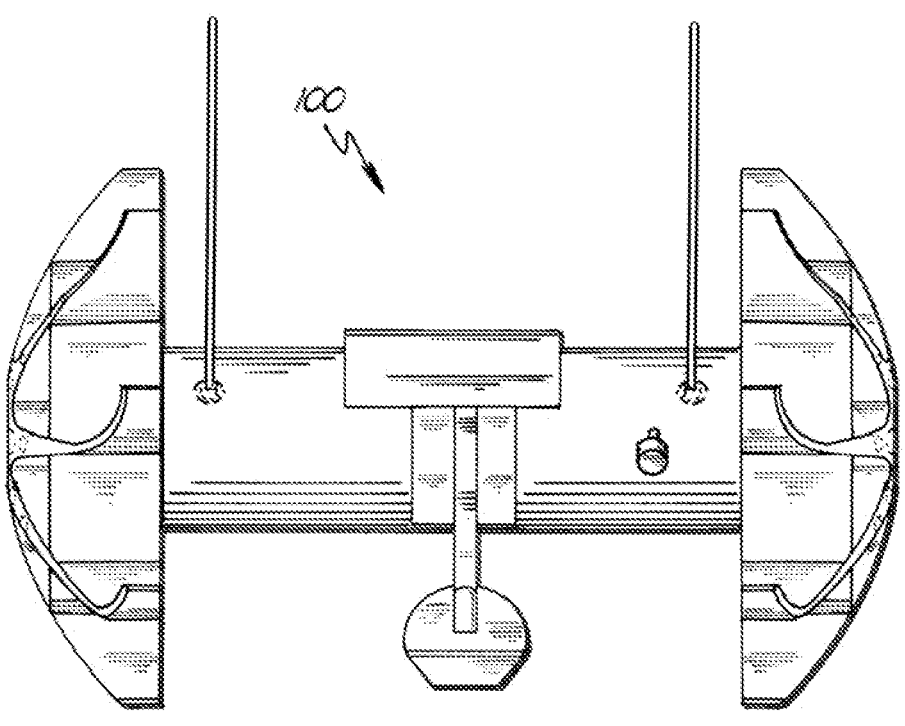
FIG. 15 is rear view of a surveillance robot according to an embodiment of the present invention, with a portion of the tail depicted in phantom.

Paddles 118 may alternatively be described or referred to as teeth, chads, grippers, blades, vanes, and treads. Paddles 118 are disposed to main portion 116 of tire and extend generally outwardly from the center of tire 112. In an embodiment, paddles 118 may be triangular-like teeth, as depicted in FIGS. 3A-3C. In another embodiment, paddles 118 may also be flap-like vanes, as depicted in FIGS. 4A-4C. In a further embodiment, paddles 118 include a pair of spaced-apart flaps that define a wedge-shaped gap, as depicted in FIGS. 5A-5C.

In the aforementioned and other embodiments, paddles 118 are circumferentially spaced on the outer surface of main portion 116 if tire 112. Paddles 118 extend outwardly at an angle and with spacing between respective paddles 118. In an embodiment, paddles 118 are spaced apart at equal increments between approximately thirty degrees and sixty degrees on the outer circumference of main portion 116 or tire. In a further embodiment, paddles 118 are spaced apart at equal increments of approximately forty-five degrees on the outer circumference of main portion 116 or tire. When a forward positioned paddle 118 has a downwardly facing contact pad 122 located just above the axis of wheel 102, the paddle 118 immediately therebelow is offset towards the axis. This allows a rotating forward positioned paddle 118 to engage the top surface of an obstacle that has a height greater that the radius of the tire and further drive the surveillance robot 100 up and over an obstacle by rotating of the wheels 102.

Figure 18B:
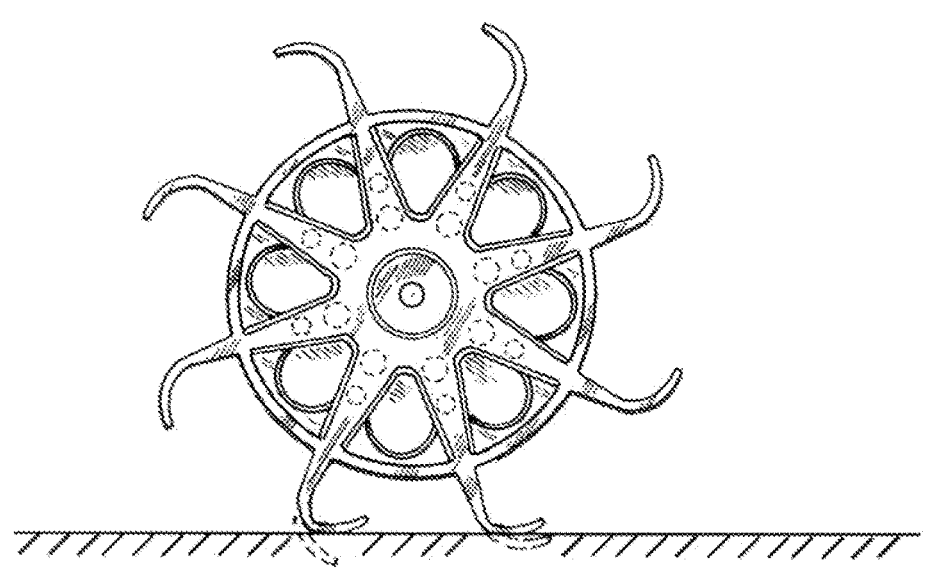
FIG. 18B is a side view of a wheel of a surveillance robot according to an embodiment of the present invention.
Figure 19A:
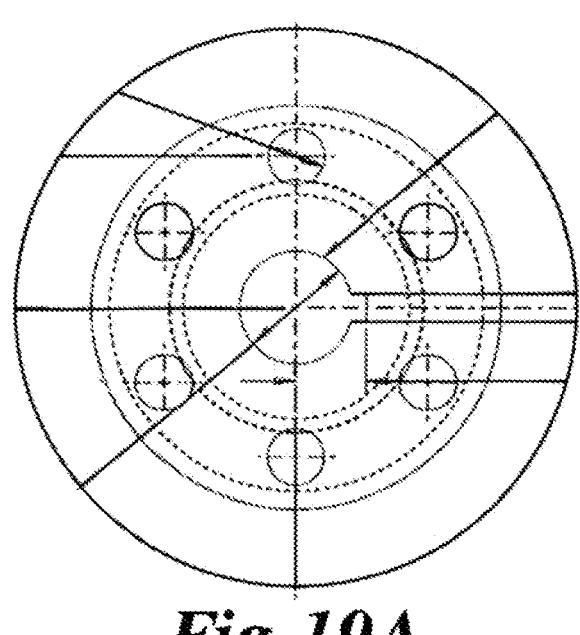
FIG. 19A is side view of a tire mount of a surveillance robot according to an embodiment of the present invention.
Figure 19B:
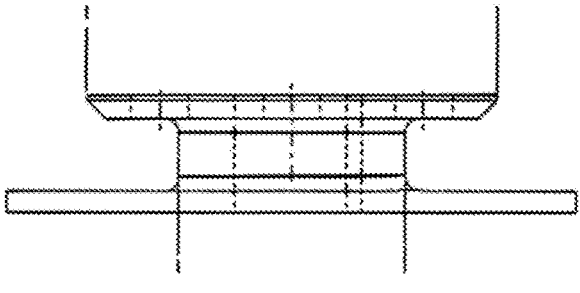
FIG. 19B is a front view of a tire mount of a surveillance robot according to an embodiment of the present invention.
Figure 20:
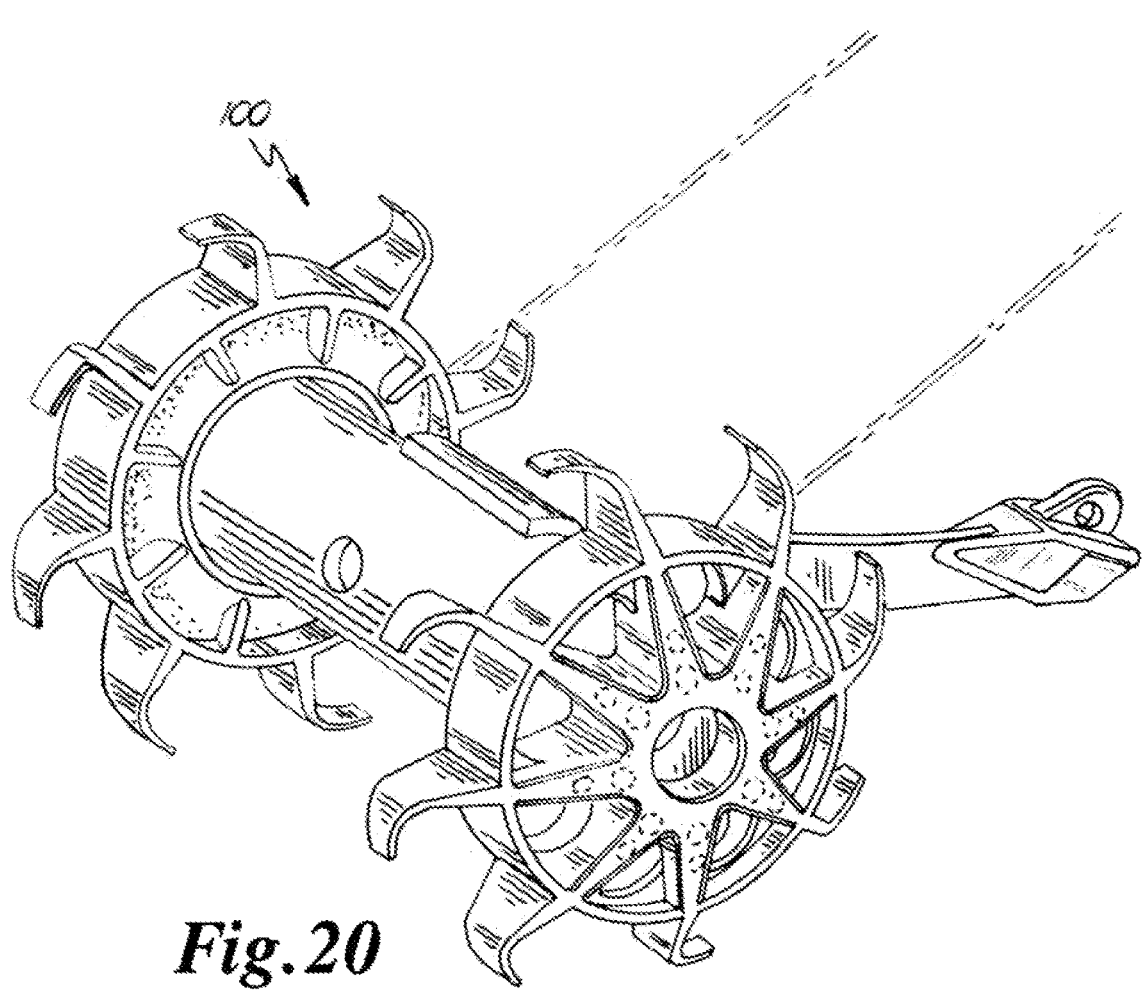
FIG. 20 is perspective view of a surveillance robot according to an embodiment of the present invention.
Figure 21:
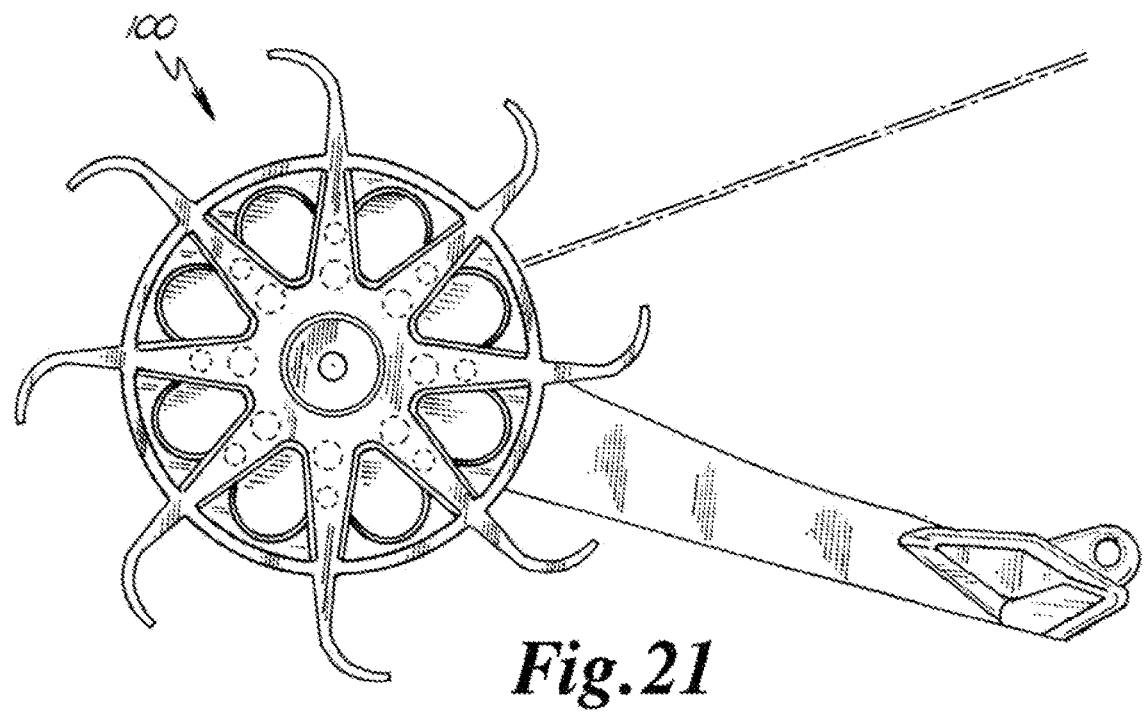
FIG. 21 is side view of a surveillance robot according to an embodiment of the present invention.
Figures 22, 23:
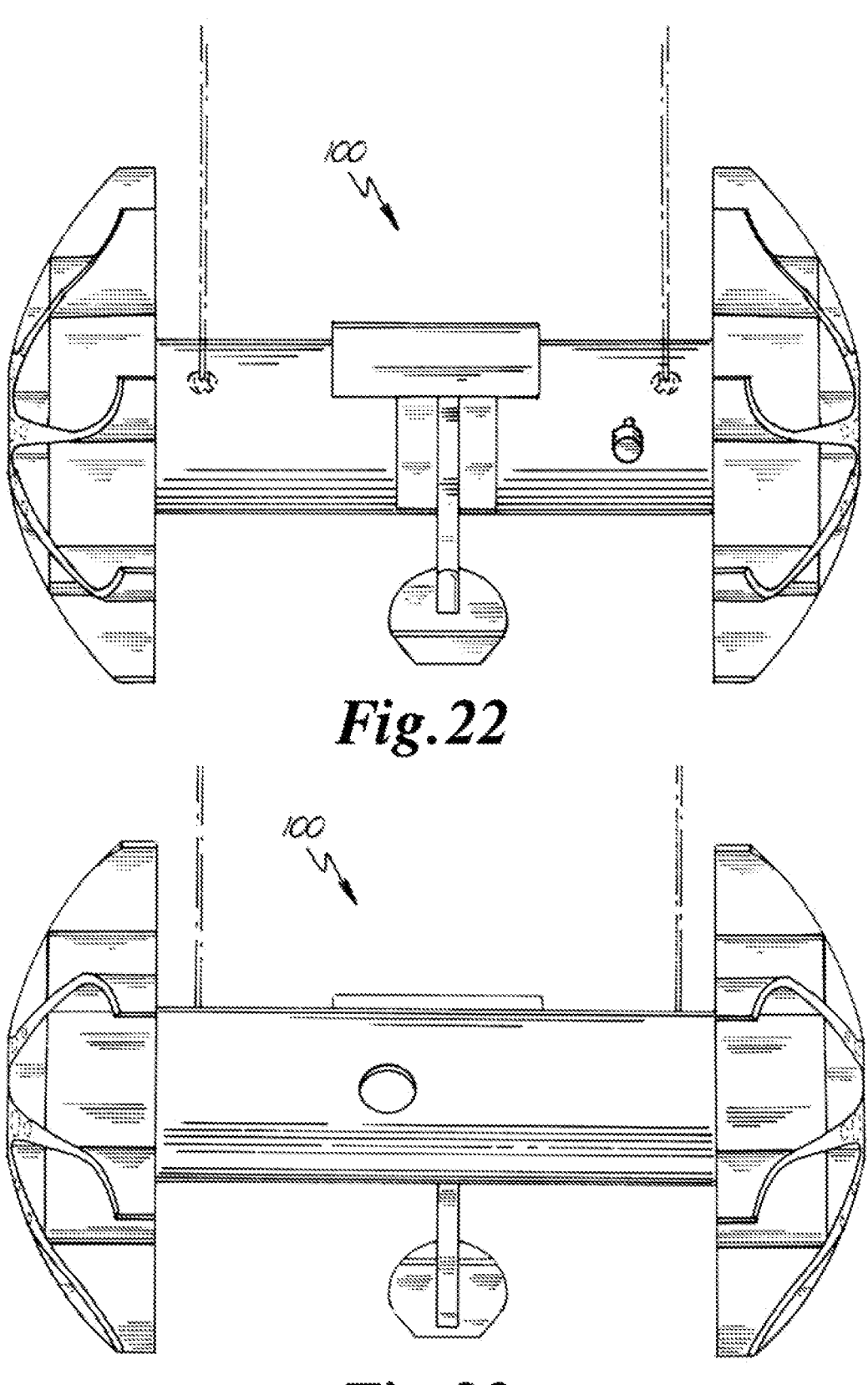
FIG. 22 is a rear view of a surveillance robot according to an embodiment of the present invention.
FIG. 23 is a front view of a surveillance robot according to an embodiment of the present invention.
Figure 24:
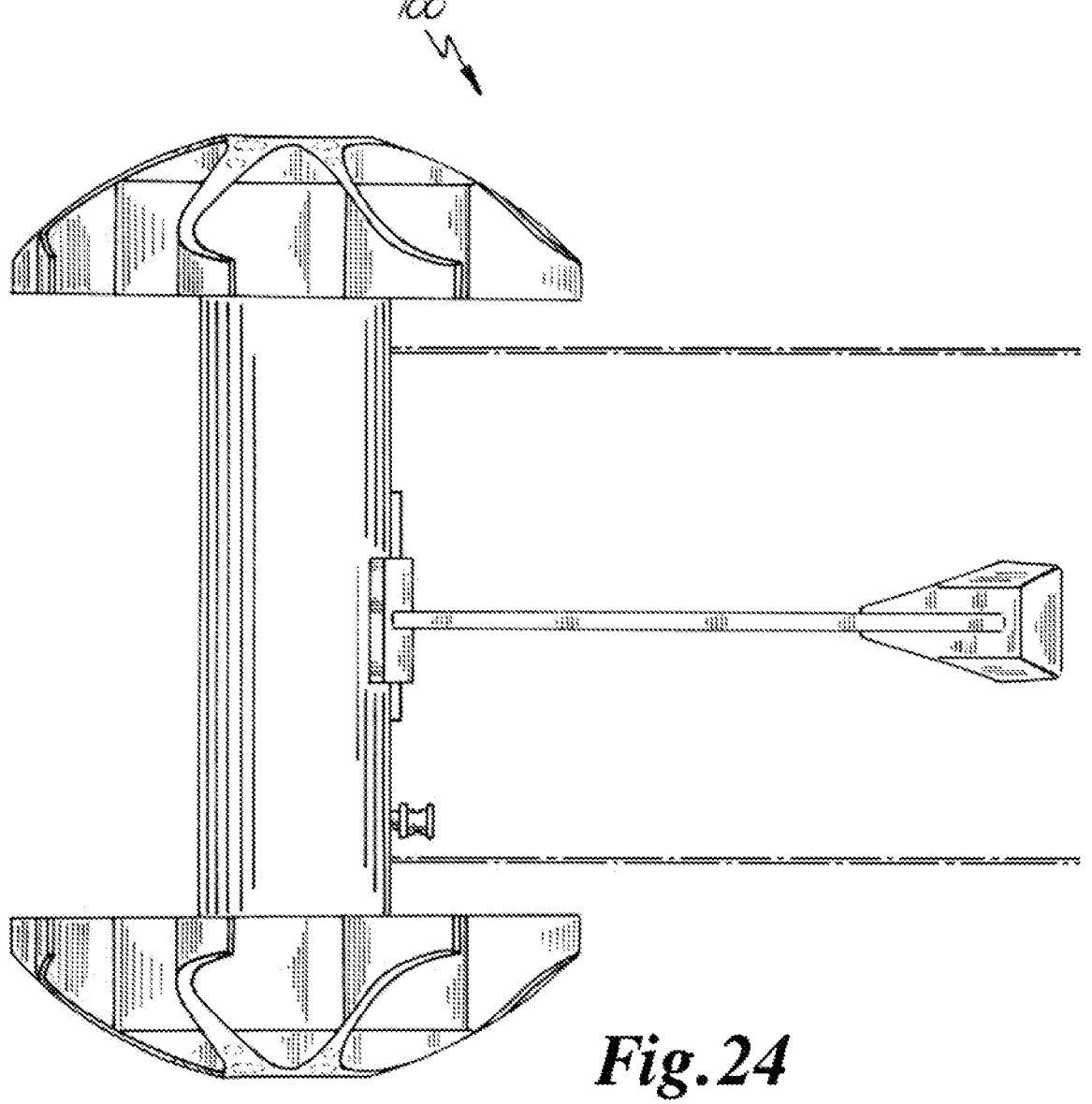
FIG. 24 is a bottom view of a surveillance robot according to an embodiment of the present invention.
Figure 25:
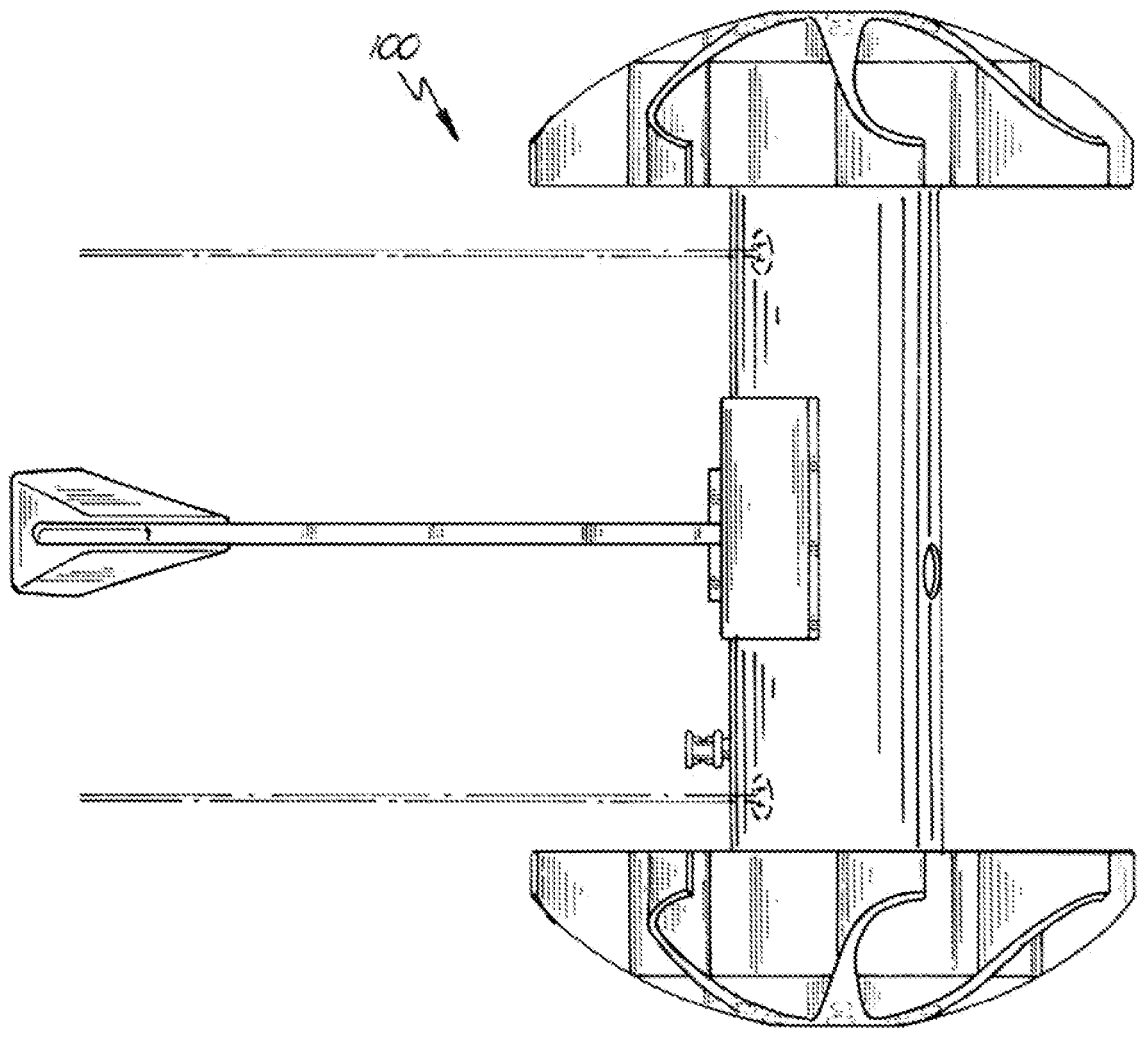
FIG. 25 is a top view of a surveillance robot according to an embodiment of the present invention.

Paddles 118 are generally able to deflect. As surveillance robot 100 progresses along terrain, contact pad 124 and transition portion 121 may flex toward the outer surface of body portion 116 of tire. Stabilizer section 120 may also flex toward the outer surface of body portion 116 of tire. In this manner, surveillance robot 100 can achieve is more level ride. Rather than proceed along a fall-and-rise cycle as different paddles 118 engage the ground, surveillance robot can proceed in a more linear fashion. Referring to FIG. 18B, In operation, paddles 118 deflect upon engaging the ground and return to their respective resting position as they rotate away from the ground. This can improve the stability of the image recorded and/or transmitted by the device and thereby improve the effectiveness of surveillance activities.

In embodiments, the end profile of tire 112 is substantially sawtooth, as depicted in FIG. 3A. Paddles 118, which appear as teeth, are oriented to lean in the direction of forward rotation. This provides obstacle-gripping surfaces, or tips 126, for the teeth forwardly positioned as the tire rotates. The tooth angle is designed so that the grabbing angle of the tooth, or horizontal contact pad 124, is vertically offset upwardly from a horizontal line extending through the center or axis of the tire 112 and is at that rotational position more forwardly positioned than the teeth therebelow. The tooth will then be able to grab the top surface of an obstacle that is greater than the radius of tire 112 and the teeth therebelow will not get in the way by abutting against the confronting side of the obstacle.

Figures 16, 17, 18A:
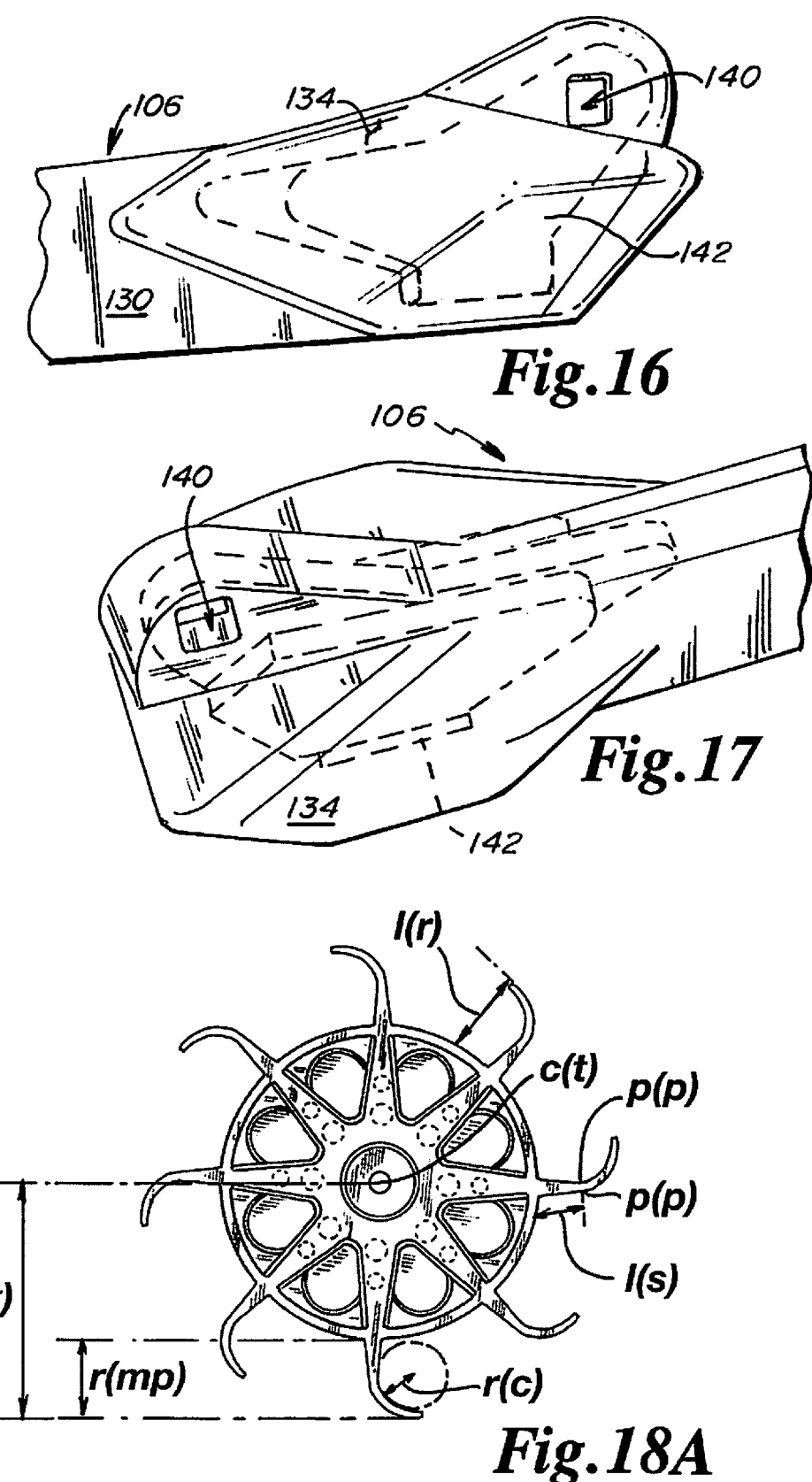
FIG. 16 is a perspective view in phantom of a portion of the tail of a surveillance robot according to an embodiment of the present invention.
FIG. 17 is a perspective view in phantom of a portion of the tail of a surveillance robot according to an embodiment of the present invention.
FIG. 18A is a side view of a wheel of a surveillance robot according to an embodiment of the present invention.

Referring to FIG. 18A, the geometry of tire 112 according to an embodiment of the present invention is generally shown. Tire 112 has center point $c(t)$ and radius $r(t)$. Main portion 116 of tire 112 shares a common center point $c(t)$ with tire 112 and has radius $r(mp)$. Paddle 118 has radius of curvature $r(c)$ between stabilizer section 120 and contact pad 122. Paddle 118 has stabilizing length $l(s)$ between the outer surface of main portion 116 of tire 112 and the point $p(p)$ on paddle 118 at which stabilizer section 120 transitions into contact pad 122. Paddle 118 has a radial length $l(r)$ between the outer surface of main portion 116 of tire 112 and tip 126.

Paddle 118 is generally tapered such that its thickness decreases toward tip 126. In an embodiment, the thickness of paddle at point $p(p)$ is between approximately 0.05 inches and approximately 0.15 inches. In a further embodiment, the thickness of paddle at point $p(p)$ is approximately 0.10 inches. In an embodiment, the thickness of paddle 118 proximal tip 126 of contact pad 124 is between approximately 0.02 and approximately 0.08 inches. In a further embodiment, the thickness of paddle 118 proximal tip 126 of contact pad 124 is approximately 0.05 inches.

In an embodiment, paddle 118 has a radial length $l(r)$ of between approximately 0.50 inches and approximately 1.0 inches. In a further embodiment, paddle 118 has a radial length $l(r)$ of approximately 0.26 inches. In an embodiment, paddle 118 has a stabilizing length $l(s)$ of between approximately 0.25 inches and approximately 0.75 inches. In a further embodiment, paddle 118 has a stabilizing length $l(s)$ of approximately 0.48 inches. In an embodiment, paddle 118 has a width proximal the outer surface of main portion 116 of tire 112 of between approximately 0.30 inches and 0.90 inches. In a further embodiment, paddle 118 has a width proximal the outer surface of main portion 116 of tire 112 of approximately 0.60 inches and is substantially the same as the width of the outer surface of main portion 116.

In an embodiment, stabilizer section 120 is oriented at an angle with respect to the tangent of main portion 116 of tire 112 of between approximately 45 degrees and approximately 115 degrees. In a further embodiment, stabilizer section 120 is oriented at an angle with respect to the tangent of main portion 116 of tire 112 of approximately 90 degrees. In an embodiment, contact pad 124 is oriented at an angle with respect to stabilizer section 120 of between approximately 45 degrees and approximately 115 degrees. In a further embodiment, contact pad 124 is oriented at an angle with respect to stabilizer section 120 of approximately 90 degrees. In an embodiment, transition portion 121 has a radius of curvature of between approximately 0.15 inches and approximately 0.45 inches. In an embodiment, transition portion 121 has a radius of curvature of approximately 0.30 inches.

In an embodiment, tire 112 has a radius $r(t)$ of between approximately 1.5 inches and approximately 3.1 inches. In a further embodiment, tire 112 has a radius $r(t)$ of approximately 2.3 inches. In an embodiment, main portion 116 of tire 116 has a radius $r(mp)$ of between approximately 1.0 inch and approximately 2.0 inches. In a further embodiment, main portion 116 of tire 116 has a radius $r(mp)$ of approximately 1.5 inches. In an embodiment, the frustoconical shape of wheels is defined by a circle radius of between approximately 1.5 inches and approximately 4.1 inches. In a further embodiment, frustoconical shape of wheels is defined by a circle radius of approximately 3.3 inches.

In an embodiment, the ratio between the radial length $l(r)$ of paddle and radius $r(t)$ of tire 112 is between approximately 1:1 and approximately 1:4. In a further embodiment, the ratio between the radial length $l(r)$ of paddle radius $r(t)$ of tire 112 is approximately 1:2. In an embodiment, the ratio between the stabilizer height $h(t)$ of stabilizer section 118 and the radial length $l(r)$ of paddle is between approximately 1:3 and approximately 1:1. In a further embodiment, the ratio between the stabilizer height $h(t)$ of stabilizer section 118 and the radial length $l(r)$ of paddle is approximately 2:3.

In an embodiment, paddles 118 are made from a material having a durometer of between approximately 60 and 100 on the Shore A scale. In a further embodiment, paddles 118 are made from a material having a durometer of approximately 80 on the Shore A scale. This relative stiffness combined with the geometry of paddles 118 allows tires 112 to support the weight of surveillance robot 100 with a deflection of between approximately ten percent and approximately forty-five percent. In a further embodiment, relative stiffness combined with the geometry of paddles 118 allows tires 112 to support the weight of surveillance robot with a deflection of approximately twenty percent.

The tire may also have a central shock absorbing portion axially positioned opposite from the body on each tire. Such axially extending portion provides shock absorbing capabilities for example when the robot is thrown and lands on one end or the other. Said central shock absorbing portion may be dome shaped, frustoconical shaped, or frustodomal shaped. In preferred embodiments, the teeth profiles will extend and be part of the central shock absorbing portion, or the shock absorbing portion will otherwise have voids, cutaway portions, gaps. Such may provide enhanced shock absorption, while minimizing weight of the tires.

The tires may utilize different compounding for different portions, to provide optimal performance. For example the inside of the curved teeth could be softer with a greater gripping capability than the outside ground engaging portion of the wheels.

Tail 106 has main section 130, proximal end 132, and distal end 134. Referring to FIGS. 6-17, tail 106 generally extends rearwardly from surveillance robot with respect to camera 108. In main section 130 of tail 108 is substantially rigid. Main section 130 is generally sufficiently rigid in up and down directions with respect to the length of tail 108 so as to prevent rotation of body 104 as wheels 102 are rotating and climbing an obstacle. The rigidity of main section 130 of tail 108 also enhances the climbing ability of surveillance robot 100 by providing a brace for, and redistributing the weight of, surveillance robot 100 as wheels 102 climb over an object.

In an embodiment, main section 130 of tail 108 is flexible in sideways directions. For these purposes, "sideways directions" means directions parallel to the axis or rotation of wheels 102. The flexibility general allows tail 108 to be resiliently formable for purposes of storage and/or throwing by a user while maintaining rigidity for climbing purposes. Tail 108 may be made from any number of materials.

Tail 108 may be made from any number of materials. In an embodiment, tail 108 may be a stiff wire rope, a metal structure, or other suitable structure that is rigid enough to keep the body portion from rotating with the wheel(s) as the wheel(s) climb an obstacle. In an embodiment, tail 108 is made primarily from a thermoplastic elastomer, such as, for example, urethane. The overall shape of tail 108 may also contribute to the combined rigidity and flexibility of tail 108. For example, main section 130 of tail 108 may be substantially or somewhat shaped like an I-beam. Tail 108 would thereby be substantially rigid in a direction normal to the "horizontal" portions of the I-beam geometry and substantially flexible in a direction substantially normal to the "vertical" portion of the I-beam geometry (the terms "horizontal" and "vertical" being used with respect to the letter "I").

In an embodiment, the proximal end 132 of tail 108 is coupled to body 104. In a further embodiment, distal end 134 of tail 108 is substantially bulbous, as depicted in FIGS. 16-17. The bulbous portion of distal end 134 of tail 112 softened to minimize noise generation during movement of surveillance robot 100. In an embodiment, distal end 134 of tail is made from a soft material that will be substantially silent when dragged on hard surfaces as surveillance robot 100 is propelled.

In an embodiment, distal end 134 of tail 108 defines aperture 140 and include weighted body 142. Aperture 140 may be used to tether objects to surveillance robot 100, such as, for example, a rope. A user may thereby utilize a tether coupled to distal end 134 of tail 108 at aperture 140 to facilitate retrieval of surveillance robot 100. A user may also utilize tether coupled to distal end 134 of tail 108 at aperture 140 to remotely deliver items of various sorts to a location.

Weighted body 142 is generally embedded with distal end 134 of tail 108. Adding weight to the tail in the manner can improve stability and increase the fraction generated between tail 108 and the ground or floor over which surveillance robot 100 is moving. This added friction improves the ability of surveillance to climb over objects by decreasing the likelihood that tail 108 will slip. In an embodiment, weighted body 142 is made from metal, such as, for example, steel or lead. In an embodiment, weighted body 142 is between approximately fifteen percent and seventy-five percent of the total weight of tail 108. In a further embodiment, weighted body is approximately forty percent of the total weight of tail 108.

Referring to FIGS. 7-15, tires 112 include a plurality compression cells 150, 152, 154, 156, 158. Upon impact, compression cells function as crush zones. This enhances the protection of the internal electronic and mechanical components of surveillance robot 100 while also altering the deflection characteristics of surveillance robot 100. As result, the durability of surveillance robot can be improved, as well as the predictability of bounces, or deflection, off of surfaces. In an embodiment, surveillance robot 100 can withstand a fall from a height of approximately 30 feet and/or approximately 37.5 foot-pounds of energy.

Embodiments of the invention include the operator interface which has a transmitter for transmitting commands, such as for controlling motion, including direction and speed of the robot, receiver for receiving, for example, video signals, controls from direction speed and direction, and a display for displaying the video signals from the remote robot Suitable drive components and other functional components for the subject device are known in the art and disclosed, for example in U.S. Pat. Nos. 6,548,982 and 6,502,657 which are incorporated by reference herein.

The invention claimed is:

1. A surveillance robot comprising:
    a pair of axially aligned drive wheels, the wheels having a maximum radius;
    a housing extending between the wheels, the housing having a radius that is less than the maximum radius of the wheels and containing a transmitter, a receiver, a power supply, a drive system including at least one drive motor connecting to the wheels, the wheels rotatable in a forward direction by the at least one drive motor, thereby moving the surveillance robot in a forward direction, and a video camera connected to the transmitter;
    wherein each of the wheels comprise a plurality of teeth extending radially outward, the teeth when viewed from the side providing a sawtooth configuration extending around each respective wheel.

2. The surveillance robot of claim 1, wherein each of the teeth are triangular like.

3. The surveillance robot of claim 2, wherein each tooth, when viewed axially with respect to the wheels, has a planar surface that is at a right angle to an adjacent planar surface of an adjacent tooth.

4. The surveillance robot of claim 1, wherein each tooth viewed axially with respect to the wheels, has a planar surface that is in alignment with a rotational axis of the wheels.

5. The surveillance robot of claim 1, wherein the teeth are resiliently flexible so as to deflect upon engaging a surface.

6. The surveillance robot of claim 1, further comprising a single tail coupled to the housing intermediate the wheels.

7. A surveillance robot comprising:
    a pair of axially aligned drive wheels, each wheel having a maximum radius, and having ground engaging teeth or paddles extending therefrom;
    a housing extending between the wheels, the housing containing a transmitter and receiver, a power supply, a drive system including at least one drive motor connecting to the wheels, and a video camera connected to the transmitter; and
    a rear tail extending from the housing, the tail including a ground engaging end portion;
    wherein each of the wheels, when viewed from an axial end, have a plurality of circular holes extending into the wheel and positioned between the teeth or paddles and an axis of the wheel.

8. The surveillance robot of claim 7, wherein the tail has a flange portion attached to the housing and a widened distal end and a mid portion extending therebetween, the mid portion having a height and a width, the height greater than the width for the entirety of a length of the mid portion.

9. The surveillance robot of claim 7 wherein each of the wheels have an inner hub portion having a diameter and a plurality of elastomeric paddles extending from the hub, an outer circular hub portion spanning between each adjacent pair of elastomeric paddles, wherein the inner hub portion, the outer circular hub portion and each adjacent pair of elastomeric paddles defining a crush zone, the radius of each of the hubs at the outer circular hub portion being less than 65% the maximum radius of each of the wheels.

10. The surveillance robot of claim 7, wherein the distal end of the tail widens from the mid portion and defines a Y-shape when viewed from above.

11. A surveillance robot comprising:

a pair of axially aligned drive wheels, each wheel having a maximum radius and a plurality of arcuate ground engaging elastomeric paddles extending radially outward from a hub, each of the plurality of arcuate paddles having a distal tip pointing circumferentially, wherein the width of each of the plurality of the arcuate ground engaging elastomeric paddles of each wheel measured in a direction parallel to the wheel axis is at a maximum at the hub and narrows to a minimum at the distal tip;

a housing extending between the wheels, the housing containing a transmitter and receiver, a power supply, a drive system including at least one drive motor connecting to the wheels, and a video camera connected to the transmitter;

a rear tail extending from the housing, the tail including a floor engaging end portion.

12. The surveillance robot of claim 11, wherein the radius of each of the hubs being less than 65% the maximum radius of each of the wheels.

13. A tire for a two-wheeled surveillance robot having a housing disposed intermediate a pair of the tires, the tire comprising:

a hub; and a plurality of elastomeric ground engaging paddles extending from the hub, each of the elastomeric paddles extending radially from the hub a distance equal to at least forty percent of the hub radius, and then the elastomeric paddles bending to extend in a circumferential direction on the tire, each of the paddles having a width, measured in a direction parallel to axis of the tires, that tapers in a direction away from hub, and wherein each hub includes a plurality of circular openings equally spaced from the respective axis of the tire.

14. The tire of claim 13, wherein the tire hub having crush zones for absorbing an impact force.

15. The surveillance robot of claim 6, a distal portion of the tail has a flat upwardly facing portion and has a V-shape when viewed from above.

* * * * *